(12) United States Patent
Wang et al.

(10) Patent No.: US 12,470,798 B2
(45) Date of Patent: Nov. 11, 2025

(54) IMAGE SHOOTING MODULE, MOTOR STRUCTURE, AND ELECTRONIC DEVICE

(71) Applicant: HUAWEI TECHNOLOGIES CO., LTD., Guangdong (CN)

(72) Inventors: Xin Wang, Shenzhen (CN); Jiapeng Dan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 18/323,563

(22) Filed: May 25, 2023

(65) Prior Publication Data

US 2023/0300443 A1      Sep. 21, 2023

Related U.S. Application Data

(63) Continuation of application No. PCT/CN2021/102473, filed on Jun. 25, 2021.

(30) Foreign Application Priority Data

Nov. 26, 2020   (CN) .......................... 202011356336.3

(51) Int. Cl.
    *H04N 23/57*  (2023.01)
    *H04N 23/55*  (2023.01)
(52) U.S. Cl.
    CPC ............ *H04N 23/57* (2023.01); *H04N 23/55* (2023.01)
(58) Field of Classification Search
    CPC .............................. H04N 23/57; H04N 23/55

USPC .......................................................... 348/262
    See application file for complete search history.

(56) References Cited

U.S. PATENT DOCUMENTS

| | | | |
|---|---|---|---|
| 2013/0177304 A1* | 7/2013 | Chapman | G03B 17/565 |
| | | | 396/533 |
| 2016/0018626 A1* | 1/2016 | Hou | G02B 13/0045 |
| | | | 359/691 |

FOREIGN PATENT DOCUMENTS

| | | |
|---|---|---|
| CN | 2901351 Y | 5/2007 |
| CN | 111684353 A | 9/2020 |
| CN | 111929802 A | 11/2020 |

OTHER PUBLICATIONS

Office Action dated Jun. 6, 2024, issued for Chinese Application No. 202011356336.3 (10 pages).
Extended European Search Report dated May 6, 2024, issued for European Application No. 21896300.7 (8 pages).
International Search Report dated Aug. 30, 2021, issued for International Application No. PCT/CN2021/102473 (10 pages).

* cited by examiner

*Primary Examiner* — Joel W Fosselman

(57) ABSTRACT

An image shooting module and/or an electronic device includes a motor structure and an image shooting assembly. A drive apparatus and a bearer of the motor structure are connected, a lens of the image shooting assembly is disposed on the bearer, and the lens is slidably connected to a lens guide rod. When the drive apparatus drives the bearer to move, the lens can be driven to move along the lens guide rod, to implement focusing, zooming, and the like of the lens.

18 Claims, 5 Drawing Sheets

IMAGE SHOOTING MODULE, MOTOR STRUCTURE, AND ELECTRONIC DEVICE

CROSS-REFERENCE TO RELATED APPLICATIONS

This application is a continuation of International Application No. PCT/CN2021/102473, filed on Jun. 25, 2021, which claims priority to Chinese Patent Application No. 202011356336.3, filed on Nov. 26, 2020. The disclosures of the aforementioned applications are hereby incorporated by reference in their entireties.

TECHNICAL FIELD

This disclosure relates to the field of terminal technologies, and in particular, to an image shooting module, a motor structure, and an electronic device.

BACKGROUND

With development of mobile phone camera technologies, for consumer electronic products such as a mobile phone, a tablet, a notebook computer, and a wearable camera, image shooting effects and requirements are expected to be as high as those of single-lens reflex cameras, and an image shooting function effect has gradually become an important feature of a terminal electronic device and one of main indicators for evaluating performance of the terminal electronic device.

A mobile phone is used as an example of a current electronic device. An image shooting module of the mobile phone usually includes a lens and a drive motor. The drive motor is a carrier for implementing zooming and focusing in the image shooting module. The lens is usually fastened to the drive motor. Under a driving force generated by the drive motor, the lens moves to a specified position, to implement zooming and focusing at different zoom rates.

However, when the image shooting module includes a plurality of movable lens groups to meet a zoom mode with higher shooting quality, for example, a continuous zoom mode, an existing drive structure is complex, which affects a movement speed and precision of a lens, and reduces a zoom effect.

SUMMARY

This disclosure provides an image shooting module, a motor structure, and an electronic device, to resolve a problem that a movement speed and precision of a lens are affected and a shooting effect is reduced due to a complex drive structure in an existing image shooting module.

A first aspect of embodiments of this disclosure provides an image shooting module, including a motor structure and an image shooting assembly. The motor structure includes a base, a drive apparatus, and a bearer, the drive apparatus is disposed on the base, and the bearer is connected to the drive apparatus.

The image shooting assembly includes a lens and a lens guide rod. The lens guide rod is disposed on the base, the lens is slidably connected to the lens guide rod, and the lens is disposed on the bearer.

In this way, when the drive apparatus drives the bearer to move, the lens can be driven to move along the lens guide rod, to implement zooming or focusing of the lens. Compared with an existing image shooting assembly, in the image shooting assembly in this embodiment, the drive apparatus is connected to the bearer, the lens is disposed on the bearer, and the lens moves along the lens guide rod under action of the drive apparatus. It may also be understood that the drive apparatus is disposed on the lens, so that the drive apparatus and the lens are coupled as a whole, and the drive apparatus drives the lens to move along the lens guide rod. Compared with an existing motor structure, in the motor structure, a guide rail for the bearer to move is not needed, and a movement system of the lens is simplified, to effectively reduce friction in sliding of the lens, and simplify the movement system of the lens in the image shooting module. This improves a movement speed and precision of the lens, and helps improve a shooting effect.

In addition, the image shooting module with a simplified movement system of the lens has a simpler arrangement, better implementability, and lower costs.

In a possible implementation of the first aspect, there are a plurality of image shooting assemblies, each image shooting assembly corresponds to one drive apparatus and one bearer, and in two image shooting assemblies, a lens of one image shooting assembly is slidably connected to a lens guide rod of the other image shooting assembly.

In this way, movement of a plurality of groups of lenses can be implemented, and the movement system of the lens is simplified in the foregoing manner, to significantly improve a movement speed and precision of the lens. For example, there may be two image shooting assemblies, two drive apparatuses are disposed on the base of the motor structure, the two drive apparatuses are respectively connected to bearers, and one image shooting assembly is disposed on each bearer.

In a possible implementation of the first aspect, a first magnet is disposed on the bearer, a second magnet is disposed on the lens, and the first magnet and the second magnet attract each other.

In this way, the lens can be disposed on the bearer through attraction between the first magnet and the second magnet, to implement coupling between the image shooting assembly and the drive apparatus, so that a movement reference manner of the drive apparatus and the lens is normalized, the movement speed and precision of the lens are improved.

In a possible implementation of the first aspect, one of the bearer and the lens is provided with a clamping part, the other one of the bearer and the lens is provided with a clamping groove, and the clamping part and the clamping groove implement positioning fitting.

In this way, the lens may be provided with the clamping part, and the bearer may be provided with the clamping groove. The clamping part may implement positioning and fit with the clamping groove, to implement a fit connection between the lens and the bearer. In addition, fitting the clamping part and the clamping groove may facilitate positioning of the lens and the bearer when the lens and the bearer are installed, and facilitate assembly of the lens and the bearer.

In a possible implementation of the first aspect, the drive apparatus includes a drive coil, a first drive magnet, and a first magnetic shielding structure in a ring shape.

A part of the first magnetic shielding structure passes through the center of the drive coil, the first drive magnet is located in the first magnetic shielding structure and is located on a side of the drive coil, magnetic induction lines of the first drive magnet are perpendicular to the drive coil, the first drive magnet and the first magnetic shielding structure are fastened to the bearer, and the drive coil is disposed on the base.

In this way, a magnetic field exists at an end of the drive coil that is close to the first drive magnet. In addition, after the drive coil is energized, an annular current is formed, and an ampere force is generated in the magnetic field of the vertical coil, the ampere force is used as a driving force to enable the first drive magnet and the first magnetic shielding structure to reciprocally move through the drive coil. The first drive magnet and the first magnetic shielding structure are fastened to the bearer. The drive coil is disposed on the base. In this way, the bearer can be driven to move along a straight line relative to the base, and the lens on the bearer is driven to move along the lens guide rod, to implement long-distance focusing, zooming, or the like in the image shooting module.

In a possible implementation of the first aspect, the drive apparatus further includes a second magnetic shielding structure parallel to the first magnetic shielding structure, and a part of the second magnetic shielding structure passes through the center of the drive coil.

A second drive magnet is disposed in the second magnetic shielding structure, the second drive magnet is located on a side of the drive coil, magnetic induction lines of the second drive magnet are perpendicular to the drive coil, the magnetic induction line of the first drive magnet and the magnetic induction line of the second drive magnet are opposite in directions, and the second drive magnet and the second magnetic shielding structure are fastened to the bearer.

A magnetic field is also generated at an end of the drive coil that is close to the second drive magnet. After being energized, the drive coil forms an annular current, to generate an ampere force in the magnetic field of the vertical coil. The ampere force may also be used as a driving force. Directions of magnetic poles of the first drive magnet and the second drive magnet may be controlled, so that the magnetic induction lines of the first drive magnet and the second drive magnet are opposite in directions. In this way, ampere forces in a same direction are generated on two sides of the drive coil as a driving force, to drive the bearer to move along a straight line. This effectively improves a driving force of the drive apparatus, and helps improve a movement speed and precision of the lens.

In a possible implementation of the first aspect, the motor structure further includes a position detection apparatus, and the position detection apparatus is configured to detect a moving position of the bearer.

The position detection apparatus detects the moving position of the bearer, that is, may detect a moving position of the lens, to determine how the lens is to move or whether the lens has moved to a required position, so as to implement closed-loop control on the motor structure.

In a possible implementation of the first aspect, the position detection apparatus includes a detection component and a sensing magnet. The sensing magnet is disposed on the bearer, the detection component is disposed on the base, and the detection component is configured to detect a magnetic field of the sensing magnet.

When the drive apparatus drives the bearer to move, the sensing magnet also moves along with the bearer. In this way, a distance between the sensing magnet and the detection component changes, and the magnetic field of the sensing magnet detected by the detection component also changes. Such change can be used to detect the moving position of the bearer, to further detect the moving position of the lens.

A second aspect of embodiments of this disclosure provides a motor structure, configured to drive an image shooting assembly to move, including a base, a drive apparatus, and a bearer. The drive apparatus is securely disposed on the base, the bearer is connected to the drive apparatus, the bearer is configured to bear a lens of the image shooting assembly, and the drive apparatus is configured to drive the lens to move along a lens guide rod of the image shooting assembly.

The motor structure includes the base, the drive apparatus, and the bearer. The drive apparatus is fastened to the base, the bearer is connected to the drive apparatus, the bearer is configured to bear a camera of the image shooting assembly, and the drive apparatus is configured to drive the lens to move along the lens guide rod of the image shooting assembly, that is, the drive apparatus and the lens are coupled as a whole by using the bearer, and the drive apparatus drives the lens to move along the lens guide rod, so that a guide rail for the bearer to move is not needed and the motor structure is simplified. In this way, a movement system of the lens is simplified, to improve a movement speed and precision of the lens, and improve a shooting effect.

In a possible implementation of the second aspect, a guide rail is further included. The guide rail is detachably disposed on the base, the bearer is slidably disposed on the guide rail, and when the bearer bears the lens, the guide rail is detached from the base.

That is, the guide rail for the bearer to slide may be disposed on the motor structure detachably. When the image shooting assembly is connected to the motor structure, and the lens is bore on the bearer, the guide rail may be detached from the base, to simplify the movement system of the lens. When the motor structure does not bear the lens, the motor structure includes the guide rail, and the drive apparatus may drive the bearer to slide on the guide rail. In this way, movement performance of the motor structure can be easily detected, and a driving effect of the motor structure can be ensured.

A third aspect of embodiments of this disclosure provides an electronic device. The electronic device includes any one of the foregoing image shooting modules or the foregoing motor structures.

The electronic device includes the image shooting module or the motor structure. In the image shooting module and the motor structure, because a drive apparatus is coupled to a lens, and the drive apparatus drives the lens to move along a lens guide rod, a guide rail for a bearer to move is not needed, and a movement system of the lens is simplified. This improves a movement speed and precision of the lens, helps improve a shooting effect of the electronic device, and improves performance of the electronic device.

DESCRIPTIONS OF REFERENCE NUMERALS

Figure 1:
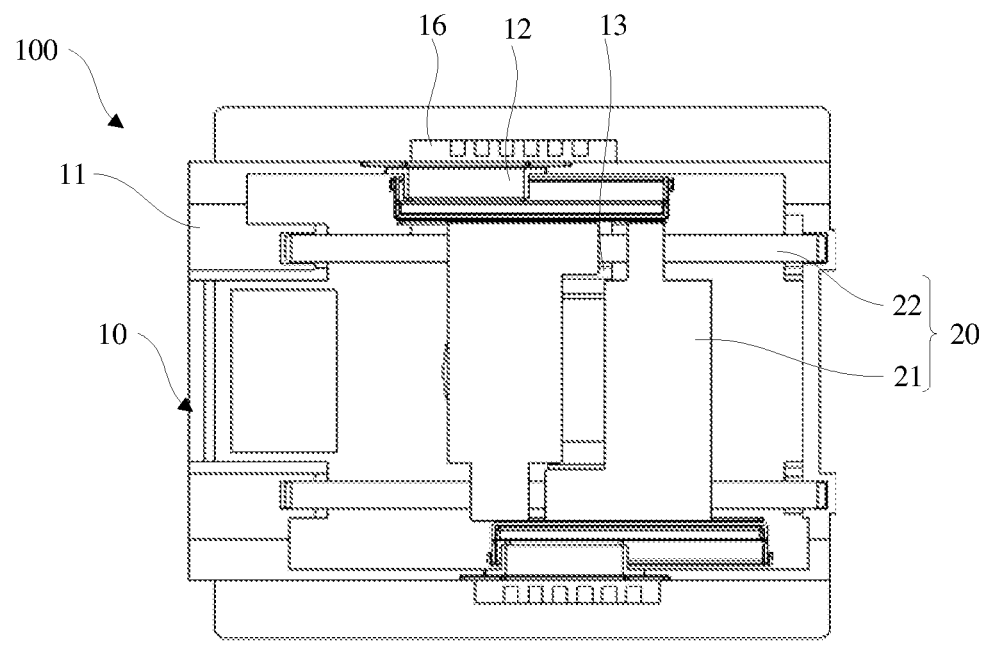
FIG. 1 is a schematic diagram of a structure of an image shooting module according to an embodiment of this disclosure.

100—Image shooting module;
10—Motor structure;
11—Base;
12—Drive apparatus;
121—Drive coil;
122—First drive magnet;
123—First magnetic shielding structure;
124—Second drive magnet;
125—Second magnetic shielding structure;
13—Bearer;
131—First magnet;
132—Clamping groove;
14—Guide rail;
15—Position detection apparatus;
151—Detection component;
152—Sensing magnet;
16—Power supply apparatus;
20—Image shooting assembly;
21—Lens;
211—Second magnet;
212—Clamping part; and
22—Lens guide rod.

DESCRIPTION OF EMBODIMENTS

Terms used in implementations of this disclosure are merely used to explain specific embodiments of this disclosure, but are not intended to limit this disclosure. The following describes implementations of embodiments of this disclosure in detail with reference to the accompanying drawings.

In recent years, an image shooting effect of electronic devices such as a smartphone becomes an important factor that consumers consider for the smartphone, and also becomes an important selling point for mobile phone manufacturers to be competitive in the market. Therefore, performance of an image shooting module of a mobile phone becomes increasingly important. A long-focus lens is popular among consumers because of an excellent long-distance shooting effect. A mobile phone is used as an example. An existing long-focus image shooting module of the mobile phone usually uses a periscope architecture design. Compared with a fixed-focus long-focus lens, a continuous zoom lens has a ZOOM lens group besides an AF focusing lens group. Two movable lens groups are included, and consequently, an optical system of the entire module is more complex.

A drive motor is a carrier for implementing zooming and focusing in the image shooting module. Driven by a thrust of the motor, the lens reaches a specified position as the motor carrier moves, to implement zooming and focusing at different zoom rates. A continuous zoom module includes more than one group of movable lens groups, and a movement distance of a lens is larger, and a precision requirement is higher. In an existing image shooting module, a motor structure usually includes a drive apparatus, a carrier, and a guide rail. The drive apparatus may drive the carrier to move on the guide rail of the motor structure. A lens of the image shooting module is disposed on the carrier, and the lens may be slidably disposed on a moving guide rail of the lens. The drive apparatus may drive, by using the carrier, the lens to move along the moving guide rail of the lens. However, when a plurality of lens groups need to move, there are a plurality of guide rails in the motor structure, and the motor structure becomes complex. As a result, a movement system of the lens in the entire image shooting module is complex, and a movement speed and precision of the lens are affected, and a shooting effect is reduced.

Based on the foregoing technical problem, embodiments of this disclosure provide an image shooting module, a motor structure, and an electronic device. In the image shooting module, a drive apparatus is connected to a bearer, a lens is disposed on the bearer, and the lens is slidably connected to a lens guide rod. When the drive apparatus drives the bearer to move, the lens can be driven to move along the lens guide rod, to implement focusing and zooming of the lens. That is, the drive apparatus is disposed on the lens, so that the drive apparatus and the lens are coupled as a whole. In addition, the drive apparatus drives the lens to move along the lens guide rod, so that a guide rail for the bearer to move is not needed, friction in sliding of the lens is reduced, and a movement system of the lens in the image shooting module is simplified, to improve a movement speed and precision of the lens, and help improve a shooting effect.

With reference to the accompanying drawings, the following describes in detail an image shooting module, a motor structure, and an electronic device provided in embodiments of this disclosure.

FIG. 1 is a schematic diagram of a structure of an image shooting module according to an embodiment of this disclosure.

As shown in FIG. 1, an embodiment of this disclosure provides an image shooting module 100, including a motor structure 10 and an image shooting assembly 20. The motor structure 10 includes a base 11, a drive apparatus 12, and a bearer 13. The drive apparatus 12 is disposed on the base 11, and the bearer 13 is connected to the drive apparatus 12. In this way, a driving force generated by the drive apparatus 12 can drive the bearer 13 to move.

The image shooting assembly 20 includes a lens 21 and a lens guide rod 22. The lens guide rod 22 is disposed on the base 11, the lens 21 is slidably connected to the lens guide rod 22, and the lens 21 is disposed on the bearer 13. In this way, when the drive apparatus 12 drives the bearer 13 to move, the lens 21 can be driven to move along the lens guide rod 22, to implement zooming or focusing of the lens 21. Compared with an existing image shooting assembly 20, in the image shooting assembly 20 in this embodiment, the drive apparatus 12 is connected to the bearer 13, the lens 21 is disposed on the bearer 13, and the lens 21 moves along the lens guide rod 22 under action of the drive apparatus 12. It may also be understood that the drive apparatus 12 is disposed on the lens 21, so that the drive apparatus 12 and the lens 21 are coupled as a whole, and the drive apparatus 12 drives the lens 21 to move along the lens guide rod 22. Compared with an existing motor structure 10, in the motor structure 10, a guide rail 14 for the bearer 13 to move is not needed, and a movement system of the lens 21 is simplified, to effectively reduce friction in sliding of the lens 21, and simplify the movement system of the lens 21 in the image shooting module 100. This improves a movement speed and precision of the lens 21, and helps improve a shooting effect.

In addition, the image shooting module 100 with a simplified movement system of the lens 21 has a simpler arrangement, better implementability, and lower costs.

There may be a plurality of image shooting assemblies 20, and each image shooting assembly 20 is corresponding to one drive apparatus 12 and one bearer 13. That is, one image shooting assembly 20 may be disposed on one bearer 13, and the image shooting assembly 20 is driven by one drive apparatus 12. In this way, a plurality of groups of lenses 21 can be moved.

In two image shooting assemblies 20, a lens 21 of one image shooting assembly 20 is slidably connected to a lens guide rod 22 of the other image shooting assembly 20, and one lens 21 is disposed on two lens guide rods 22 and moves along the two lens guide rods 22. This helps improve movement stability the lens 21.

Referring specifically to FIG. 1, two image shooting assemblies 20 are included (refer to FIG. 9): a first image shooting assembly and a second image shooting assembly. The first image shooting assembly includes a first lens and a first lens guide rod, and the second image shooting assembly includes a second lens and a second lens guide rod. One end of the first lens is slidably connected to the first lens guide rod, the other end of the first lens is slidably connected to the second lens guide rod, and one end of the second lens is slidably connected to the second lens guide rod, and the other end of the second lens is slidably connected to the first lens guide rod. In this way, both the first lens and the second lens move along the first lens guide rod and the second lens guide rod, to improve movement stability the first lens and the second lens.

In addition, when there are a plurality of image shooting assemblies, that is, the image shooting assemblies include a plurality of groups of lenses that need to be moved, a movement system of the lens of the image shooting module is complex. However, the image shooting module provided in this embodiment of this disclosure can simplify the movement system of the lens in the foregoing manner, to significantly improve a movement speed and precision of the lens.

Figure 7:
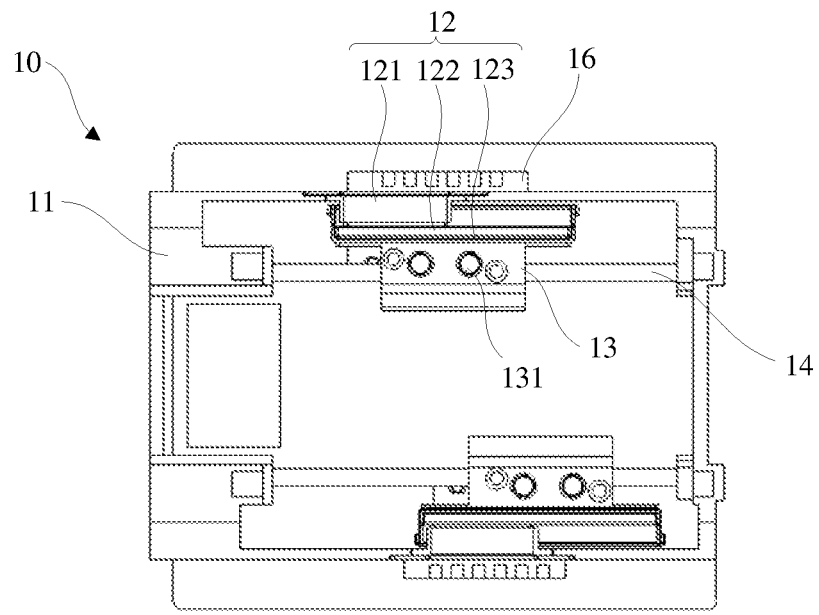
FIG. 7 is a schematic diagram of a structure of a motor structure according to an embodiment of this disclosure.

Specifically, as shown in FIG. 1, the two image shooting assemblies 20 are used as an example. Two drive apparatuses 12 are disposed on the base 11 of the motor structure 10, and the two drive apparatuses 12 are respectively connected to bearers 13. The first lens is disposed on a first bearer, the second lens is disposed on a second bearer, an end of the first lens is slidably connected to the first lens guide rod, the other end of the first lens is slidably connected to the second lens guide rod, and an end of the second lens is slidably connected to the second lens guide rod, the other end of the second lens is slidably connected to the first lens guide rod. Comparison is made with a case in which there is the guide rail 14 on the motor structure 10. Specifically, each guide rail 14 corresponds to one bearer 13. As shown in FIG. 7, the motor structure includes a first guide rail and a second guide rail, a first bearer is slidably connected to the first guide rail, and a second bearer is slidably connected to the second guide rail. After the motor structure 10 and an image shooting assembly 20 are assembled, movement of a first lens is related to the first guide rail, a first lens guide rod, a second lens guide rod, and the second guide rail. Correspondingly, movement of a second lens is related to the second guide rail, the second lens guide rod, the first lens guide rod, and the first guide rail. As a result, a movement system of the lens is relatively complex.

However, in this embodiment of this disclosure, the guide rail 14 connected to the bearer in the motor structure 10 is not needed. In this way, after the motor structure 10 and the image shooting assembly 20 are assembled, a movement of the first lens is related to the first lens guide rod and the second lens guide rod, and a movement of the second lens is related to the second lens guide rod and the first lens guide rod. This significantly reduces friction in sliding of the lens 21, simplifies a movement system of the lens 21, and effectively improves a movement speed and precision of the lens 21.

Figure 2:
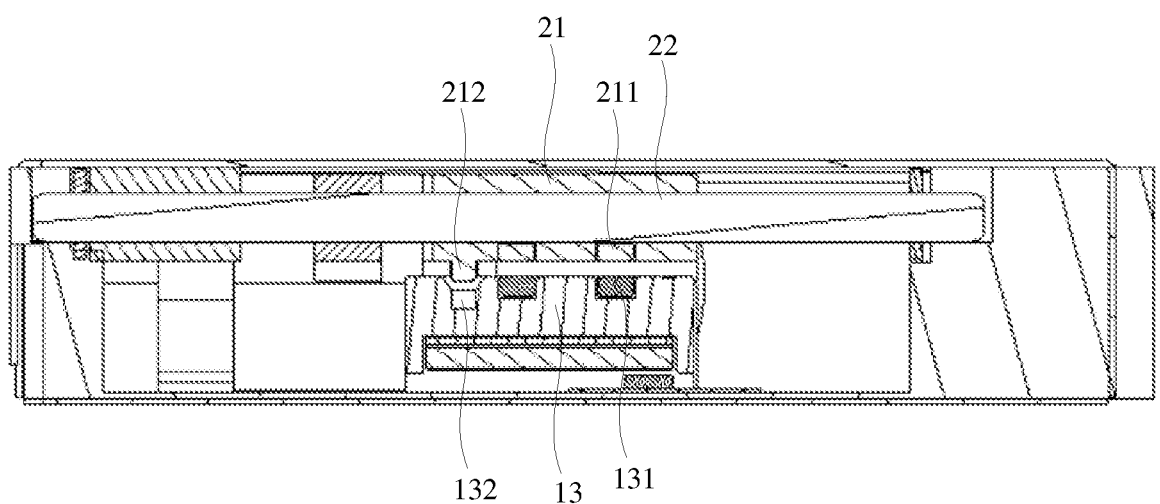
FIG. 2 is a schematic diagram of assembly of a bearer and a lens in an image shooting module according to an embodiment of this disclosure.

FIG. 2 is a schematic diagram of assembly of a bearer and a lens in an image shooting module according to an embodiment of this disclosure.

As shown in FIG. 2, in this embodiment of this disclosure, a first magnet 131 is disposed on the bearer 13, a second magnet 211 is disposed on the lens 21, and the first magnet 131 and the second magnet 211 attract each other. In this way, the lens 21 can be disposed on the bearer 13 through attraction between the first magnet 131 and the second magnet 211, to implement coupling between the image shooting assembly 20 and the drive apparatus 12, so that a movement reference manner of the drive apparatus 12 and the lens 21 is normalized, the movement speed and precision of the lens 21 are improved.

One of the bearer 13 and the lens 21 may be further provided with a clamping part, and the other of the bearer 13 and the lens 21 may be provided with a clamping groove. Specifically, in this embodiment of this disclosure, as shown in FIG. 2, the lens 21 may be provided with the clamping part 212, and the bearer 13 may be provided with the clamping groove 132. The clamping part 212 and the clamping groove 132 may implement positioning fitting, to implement a fit connection between the lens 21 and the bearer 13. In addition, fitting the clamping part 212 and the clamping groove 132 may facilitate positioning of the lens 21 and the bearer 13 when the lens 21 and the bearer 13 are installed, and facilitate assembly of the lens 21 and the bearer 13.

Specifically, the clamping part 212 may be a protrusion formed on a side that is of the lens 21 and that faces the bearer 13, and the clamping groove 132 may be a groove formed on a side that is of the bearer 13 and that faces the lens 21.

When the lens 21 is disposed on the bearer 13 by using the first magnet 131, the second magnet 211, the clamping part 212, and the clamping groove 132, the lens 21 and the bearer 13 may be further secured by using an adhesive layer, to improve strength of a connection between the lens 21 and the bearer 13, ensure stability of disposing the lens 21, and help improve a shooting effect of the lens 21.

Figure 3:
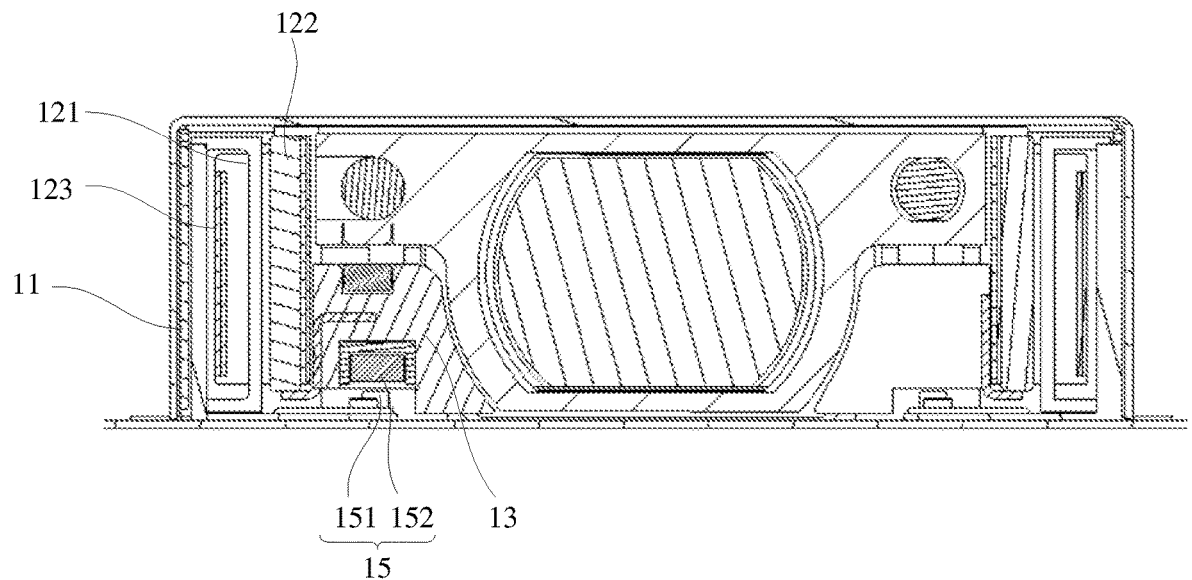
FIG. 3 is a schematic structural side view of an image shooting module according to an embodiment of this disclosure.

FIG. 3 is a schematic structural side view of an image shooting module according to an embodiment of this disclosure.

Referring to FIG. 3, in this embodiment of this disclosure, the motor structure 10 further includes a position detection apparatus 15. The position detection apparatus 15 is configured to detect a moving position of the bearer 13, that is, may detect a movement position of the lens 21, to determine how the lens 21 is to move or whether the lens 21 has moved to a required position, so as to implement closed-loop control on the motor structure 10.

Referring specifically to FIG. 3, the position detection apparatus 15 may include a detection component 151 and a sensing magnet 152. The sensing magnet 152 is disposed on the bearer 13, the detection component 151 is disposed on the base 11, and the detection component 151 is configured to detect a magnetic field of the sensing magnet 152. When the drive apparatus 12 drives the bearer 13 to move, the sensing magnet 152 also moves along with the bearer 13. In this way, a distance between the sensing magnet 152 and the detection component 151 changes, and the magnetic field of the sensing magnet 152 detected by the detection component 151 also changes. Such change can be used to detect a moving position of the bearer 13, to further detect a moving position of the lens 21.

In addition, the detection component 151 is disposed on the base 11, a drive coil 121 of the drive apparatus 12 may also be disposed on the base 11, and the sensing magnet 152 is disposed on the bearer. In this way, a part that needs to be powered in the motor structure 10 is securely disposed on the base 11, and a moving magnetic motor structure is formed, so that a structure form of the motor structure 10 tends to be simple, and implementation difficulty of the motor structure 10 is reduced.

Figure 4:
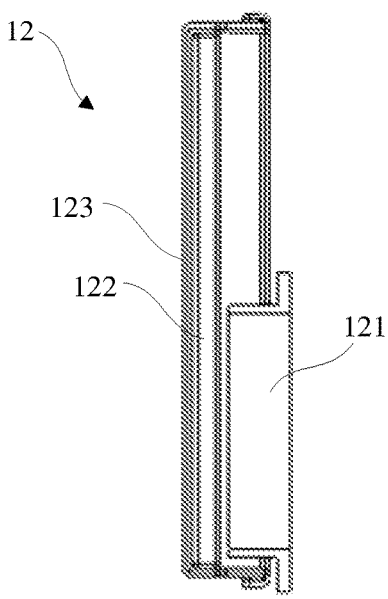
FIG. 4 is a schematic diagram of a structure of a drive apparatus according to an embodiment of this disclosure.
Figure 5:
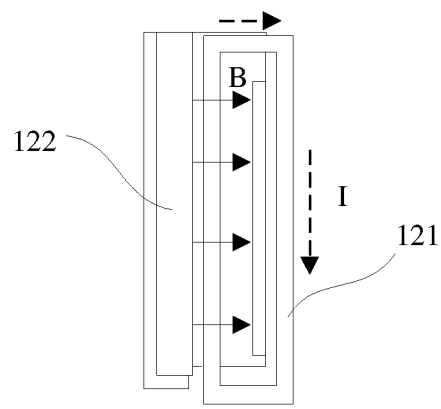
FIG. 5 is an enlarged diagram of a part of a drive apparatus according to an embodiment of this disclosure.

FIG. 4 is a schematic diagram of a structure of a drive apparatus according to an embodiment of this disclosure. FIG. 5 is an enlarged diagram of a part of a drive apparatus according to an embodiment of this disclosure.

In this embodiment of this disclosure, as shown in FIG. 4, the drive apparatus 12 includes the drive coil 121, a first drive magnet 122, and a first magnetic shielding structure 123 of a ring shape. A part of the first magnetic shielding structure 123 passes through the center of the drive coil 121, and the first drive magnet 122 is located in the first magnetic shielding structure 123 and located on a side of the drive coil 121.

Referring to FIG. 5, the first drive magnet 122 may form, through a magnetizing effect, magnetic induction lines (in a direction B in FIG. 5) that are perpendicular to an extension direction of the drive coil 121 (that is, perpendicular to a surrounding center line of the drive coil 121). In this way, a magnetic field exists at an end of the drive coil 121 that is close to the first drive magnet 122. In addition, after the drive coil 121 is energized, an annular current (in a direction I in FIG. 5) is formed, and an ampere force is generated in the magnetic field of the vertical coil, the ampere force is used as a driving force to enable the first drive magnet 122 and the first magnetic shielding structure 123 to reciprocally move through the drive coil 121. The first drive magnet 122 and the first magnetic shielding structure 123 are fastened to the bearer 13. The drive coil 121 is disposed on the base 11. In this way, the bearer 13 can be driven to move along a straight line relative to the base 11, and the lens 21 on the bearer 13 is driven to move along the lens guide rod 22, to implement long-distance focusing, zooming, or the like in the image shooting module 100.

A forming material of the magnetic shielding structure may be a material having excellent magnetic conductivity.

Figure 6:
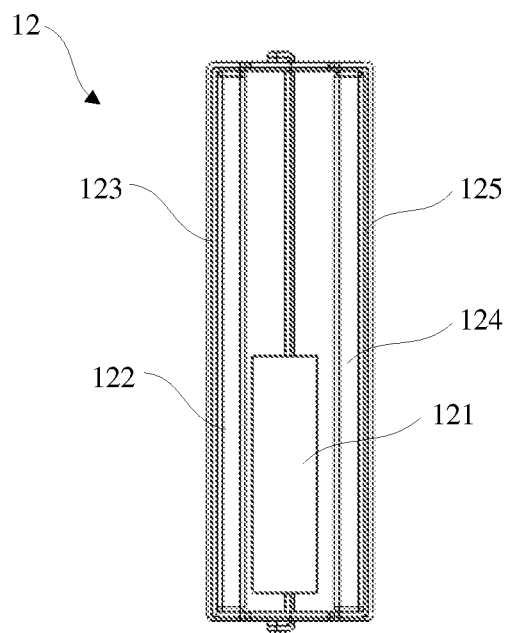
FIG. 6 is a schematic diagram of another structure of a drive apparatus according to an embodiment of this disclosure.

FIG. 6 is a schematic diagram of another structure of a drive apparatus according to an embodiment of this disclosure.

As shown in FIG. 6, in this embodiment of this disclosure, the drive apparatus 12 may further include a second magnetic shielding structure 125 parallel to the first magnetic shielding structure 123. The first magnetic shielding structure 123 and the second magnetic shielding structure 125 may form a double-ring structure, and a part of the second magnetic shielding structure 125 passes through the center of the drive coil 121. A second drive magnet 124 is disposed in the second magnetic shielding structure 125. The second drive magnet 124 forms magnetic induction lines perpendicular to the drive coil 121 through a magnetizing effect. A magnetic field is also generated at an end of the drive coil 121 that is close to the second drive magnet 124. After being energized, the drive coil 121 forms an annular current, to generate an ampere force in the magnetic field of the vertical coil. The ampere force may also be used as a driving force. Directions of magnetic poles of the first drive magnet 122 and the second drive magnet 124 may be controlled, so that the magnetic induction lines of the first drive magnet 122 and the second drive magnet 124 are opposite in directions. In this way, ampere forces in a same direction are generated on two sides of the drive coil 121 as a driving force, to drive the bearer 13 to move along a straight line. This effectively improves a driving force of the drive apparatus 12, and helps improve a movement speed and precision of the lens 21.

With reference to FIG. 1, the image shooting module 100 may further include a power supply apparatus 16. The power supply apparatus 16 may be connected to the drive coil 121 to supply power to the drive coil 121.

Figure 8:
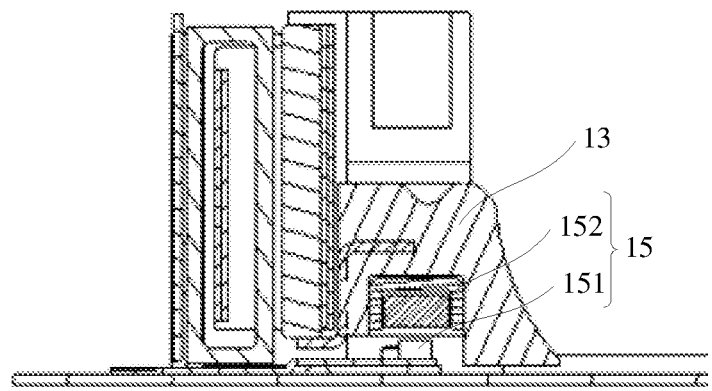
FIG. 8 is a schematic structural side view of a motor structure according to an embodiment of this disclosure.
Figure 9:
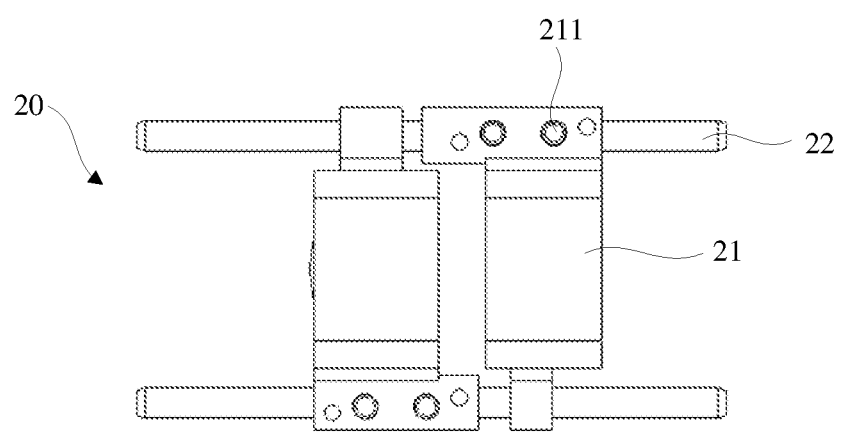
FIG. 9 is a schematic diagram of a structure of an image shooting assembly according to an embodiment of this disclosure.

FIG. 7 is a schematic diagram of a structure of a motor structure according to an embodiment of this disclosure. FIG. 8 is a schematic structural side view of a motor structure according to an embodiment of this disclosure. FIG. 9 is a schematic diagram of a structure of an image shooting assembly according to an embodiment of this disclosure.

An embodiment of this disclosure further provides a motor structure 10, configured to drive the image shooting assembly 20 to move, to implement camera focusing, zooming, or the like. The motor structure 10 and the image shooting assembly 20 are assembled to form the image shooting module 100. The motor structure 10 may be applied to a periscope long-focus module, and is configured to implement long-distance focusing of the module.

Specifically, as shown in FIG. 7 and FIG. 8, the motor structure 10 includes a base 11, a drive apparatus 12, and a bearer 13. The drive apparatus 12 is securely disposed on the base 11, the bearer 13 is connected to the drive apparatus 12, the bearer 13 is configured to bear a lens 21 of the image shooting assembly 20, and the drive apparatus 12 is configured to drive the lens 21 to move along a lens guide rod 22 of the image shooting assembly 20. In this way, the drive apparatus 12 drives the bearer 13 to move, to drive the lens 21 to move along the lens guide rod 22, implementing zooming, focusing, or the like of the lens 21. That is, the drive apparatus 12 is coupled to the lens 21 by using the bearer as a whole, and the drive apparatus 12 drives the lens 21 to move along the lens guide rod 22, so that a guide rail 14 for the bearer 13 to move is not needed, the motor structure 10 is simplified, and a movement system of the lens 21 is simplified, to improve a movement speed and precision of the lens 21 and improve an image shooting effect.

As shown in FIG. 7 and FIG. 8, the motor structure 10 may further include a guide rail 14. The guide rail 14 may be detachably disposed on the base 11, the bearer 13 is slidably disposed on the guide rail 14, and when the bearer 13 bears the lens 21, the guide rail 14 is detached from the base 11. In other words, the guide rail 14 for the bearer 13 to slide may be detachably disposed on the motor structure 10. With reference to FIG. 9 and FIG. 1, when the image shooting assembly 20 is connected to the motor structure 10, and the lens 21 is bore on the bearer 13, the guide rail 14 may be detached from the base 11, to simplify a movement system of the lens 21.

When the motor structure 10 does not bear the lens 21, the motor structure 10 includes the guide rail 14, and the drive apparatus 12 may drive the bearer 13 to slide on the guide rail 14. In this way, movement performance of the motor structure 10 can be easily detected, and a driving effect of the motor structure 10 can be ensured.

The motor structure 10 may include a plurality of guide rails 14, the plurality of guide rails 14 are disposed on the base 1L, each guide rail 14 corresponds to one bearer 13 and one drive apparatus 12, and each bearer 13 may bear at least one group of lenses 21. In this way, a plurality of groups of lenses can be moved, and the plurality of groups of lenses can be applied to a long-distance zoom module, so that a movement system of a lens can be effectively simplified, and a movement speed and precision of the lens can be improved.

With reference to FIG. 7 and FIG. 9, a first magnet 131 may be disposed on the bearer 13 of the motor structure 10, and a second magnet 211 may be disposed on the lens 21 of the image shooting assembly 20. The first magnet 131 and the second magnet 211 attract each other, and the lens 21 is disposed on the bearer 13.

The bearer 13 may be further provided with a clamping groove 132, and the lens 21 may be provided with a clamping part that can perform positioning and fitting with the clamping groove 132, to implement a fit connection between the lens 21 and the bearer 13. In this way, the lens 21 is fastened to the bearer 13 through attraction between the first magnet 131 and the second magnet 211 and fit of the clamping part 212 and the clamping groove 132, so as to implement coupling between the image shooting assembly 20 and the drive apparatus 12.

When the motor structure 10 and the image shooting assembly 20 are assembled, the first magnet 131 and the second magnet 211 that are disposed on the lens 21 and the bearer 13 first attract each other, and the clamping part 212 on the lens 21 and the clamping groove 132 on the bearer 13 implement positioning fitting, so that the lens 21 is securely disposed on the bearer 13. Then, the lens 21 and the bearer 13 may further be secured by using an adhesive layer, and finally the guide rail 14 in the motor structure 10 is detached, to simplify a structure of the motor structure 10 and simplify a movement system of the lens.

Referring to FIG. 8, the motor structure 10 may further include a position detection apparatus 15, configured to detect a moving position of the bearer 13, to further detect a moving position of the lens 21.

Specifically, the position detection apparatus 15 may include a detection component 151 and a sensing magnet 152. The sensing magnet 152 may be disposed on the bearer 13. The detection component 151 may be disposed on the base 11. The detection component 151 is configured to detect a magnetic field of the sensing magnet 152, to detect a moving position of the bearer 13 based on a change of the magnetic field of the sensing magnet 152.

In this embodiment of this disclosure, the drive apparatus 12 of the motor structure 10 may include a drive coil 121, a first drive magnet 122, and a first magnetic shielding structure 123 in a ring shape. A part of the first magnetic shielding structure 123 passes through the center of the drive coil 121. The first drive magnet 122 is located in the first magnetic shielding structure 123 and is located on a side of the drive coil 121. Magnetic induction lines of the first drive magnet 122 are perpendicular to the drive coil 121, so that a magnetic field exists at an end of the drive coil 121 that is close to the first drive magnet 122. An ampere force generated after the drive coil 121 is energized may be used as a driving force to drive the bearer 13 to move, so that the lens 21 on the bearer 13 is driven to move along the lens guide rod 22, to implement long-distance focusing, zooming, or the like of the image shooting module 100.

The drive apparatus 12 may further include a second magnetic shielding structure 125 parallel to the first magnetic shielding structure 123, and a part of the second magnetic shielding structure 125 passes through the center of the drive coil 121. A second drive magnet 124 is disposed in the second magnetic shielding structure 125. Magnetic induction lines of the second drive magnet 124 are perpendicular to the drive coil 121. A magnetic field is also generated at an end of the drive coil 121 that is close to the second drive magnet 124. After the drive coil 121 is energized, an ampere force is generated. Directions of magnetic poles of the first drive magnet 122 and the second drive magnet 124 may be controlled, so that ampere forces in a same direction are generated on the two sides of the drive coil 121 as a driving force, to drive the bearer 13 to move along a straight line. This effectively improves a driving force of the drive apparatus 12, and helps improve a movement speed and precision of the lens 21.

Referring to FIG. 8, the image shooting module 100 may further include a power supply apparatus 16. The power supply apparatus 16 may be connected to the drive coil 121, to supply power to the drive coil 121.

An embodiment of this disclosure further provides an electronic device. The electronic device may include but is not limited to a fixed terminal or a mobile terminal with a camera lens, such as a mobile phone, a tablet computer, a notebook computer, an ultra-mobile personal computer (UMPC), a handheld computer, a touch television, an intercom, a POS machine, a netbook, a personal digital assistant (PDA), a wearable device, or a virtual reality device.

In descriptions of embodiments of this disclosure, it should be noted that, unless otherwise clearly specified and limited, the terms "install", "connect to", and "connection" should be understood in a broad sense. For example, the connection may be a fixed connection, may be an indirect connection by using an intermediate medium, or may be an internal connection between two elements or an interaction relationship between two elements. For persons of ordinary skill in the art, specific meanings of the foregoing terms in embodiments of this disclosure may be understood based on a specific situation.

The terms "first", "second", "third", "fourth", and the like (if any) in this disclosure are intended to distinguish between similar objects but do not necessarily indicate a specific order or sequence.

Finally, it should be noted that the foregoing embodiments are merely intended for describing the technical solutions of embodiments of this disclosure other than limiting embodiments of this disclosure. Although embodiments of this disclosure are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this disclosure.

What is claimed is:

1. An image shooting module comprising:
   a motor structure; and
   an image shooting assembly, wherein:
   the motor structure comprises a base, a drive apparatus, and a bearer, the drive apparatus is disposed on the base, and the bearer is connected to the drive apparatus;
   the image shooting assembly comprises a lens and a lens guide rod, the lens guide rod is disposed on the base, the lens is slidably connected to the lens guide rod, and the lens is disposed on the bearer;

a first magnet is disposed on the bearer, a second magnet is disposed on the lens, and the first magnet and the second magnet are configured to attract each other; and one of the bearer or the lens is provided with a clamping part, an other one of the bearer or the lens is provided with a clamping groove, and the clamping part and the clamping groove are configured to implement positioning fitting.

2. The image shooting module according to claim 1, wherein:

there are a plurality of image shooting assemblies and a plurality of drive apparatuses and bearers, each of the image shooting assemblies respectively corresponds to one of the drive apparatuses and one of the bearers, and in two of the image shooting assemblies, a lens of one of the image shooting assemblies is slidably connected to a lens guide rod of an other of the image shooting assemblies.

3. The image shooting module according to claim 1, wherein the drive apparatus comprises a drive coil, a first drive magnet, and a first magnetic shielding structure in a ring shape; and a part of the first magnetic shielding structure passes through a center of the drive coil, the first drive magnet is located in the first magnetic shielding structure and is located on a first side of the drive coil, first magnetic induction lines of the first drive magnet are perpendicular to the drive coil, the first drive magnet and the first magnetic shielding structure are fastened to the bearer, and the drive coil is disposed on the base.

4. The image shooting module according to claim 3, wherein the drive apparatus further comprises a second magnetic shielding structure parallel to the first magnetic shielding structure, and a part of the second magnetic shielding structure passes through the center of the drive coil; and a second drive magnet is disposed in the second magnetic shielding structure, the second drive magnet is located on a second side of the drive coil, second magnetic induction lines of the second drive magnet are perpendicular to the drive coil, the first magnetic induction lines of the first drive magnet and the second magnetic induction lines of the second drive magnet are opposite in directions, and the second drive magnet and the second magnetic shielding structure are fastened to the bearer.

5. The image shooting module according to claim 1, wherein the motor structure further comprises a position detection apparatus configured to detect a position of the bearer, and the position of the bearer is movable.

6. The image shooting module according to claim 5, wherein the position detection apparatus comprises a detection component and a sensing magnet, the sensing magnet is disposed on the bearer, the detection component is disposed on the base, and the detection component is configured to detect a magnetic field of the sensing magnet.

7. The image shooting module according to claim 1, wherein the image shooting assembly further comprises a second lens guide rod, and the lens is slidably connected to both the lens guide rod and the second lens guide rod.

8. The image shooting module according to claim 1, wherein a protrusion is formed of a side of the lens facing the bearer and a groove is formed on a side of the bearer that faces the lens; and the protrusion is configured to fit into the groove.

9. The image shooting module according to claim 1, wherein the lens is provided with the clamping part and the bearer is provided with the clamping groove; and the clamping part comprises a protrusion extending from a side of the lens that faces the bearer, and the clamping groove is a groove formed in the bearer on a side of the bearer that faces the lens.

10. The image shooting module according to claim 1, wherein the lens and the bearer are secured to each other by an adhesive layer.

11. An electronic device comprising:

an image shooting module comprising a motor structure and an image shooting assembly, wherein:

the motor structure comprises a base, a drive apparatus, and a bearer, the drive apparatus is disposed on the base, and the bearer is connected to the drive apparatus;

the image shooting assembly comprises a lens and a lens guide rod, the lens guide rod is disposed on the base, the lens is slidably connected to the lens guide rod, and the lens is disposed on the bearer;

a first magnet is disposed on the bearer, a second magnet is disposed on the lens, and the first magnet and the second magnet are configured to attract each other; and one of the bearer or the lens is provided with a clamping part, an other one of the bearer or the lens is provided with a clamping groove, and the clamping part and the clamping groove are configured to implement positioning fitting.

12. The electronic device according to claim 11, wherein:

there are a plurality of image shooting assemblies and a plurality of drive apparatuses and bearers, each of the image shooting assemblies respectively corresponds to one of the drive apparatuses and one of the bearers, and in two of the image shooting assemblies, a lens of one of the image shooting assemblies is slidably connected to a lens guide rod of an other image shooting assemblies.

13. The electronic device according to claim 11, wherein the drive apparatus comprises a drive coil, a first drive magnet, and a first magnetic shielding structure in a ring shape; and a part of the first magnetic shielding structure passes through a center of the drive coil, the first drive magnet is located in the first magnetic shielding structure and is located on a first side of the drive coil, first magnetic induction lines of the first drive magnet are perpendicular to the drive coil, the first drive magnet and the first magnetic shielding structure are fastened to the bearer, and the drive coil is disposed on the base.

14. The electronic device according to claim 13, wherein the drive apparatus further comprises a second magnetic shielding structure parallel to the first magnetic shielding structure, and a part of the second magnetic shielding structure passes through the center of the drive coil; and a second drive magnet is disposed in the second magnetic shielding structure, the second drive magnet is located on a second side of the drive coil, second magnetic induction lines of the second drive magnet are perpendicular to the drive coil, the first magnetic induction lines of the first drive magnet and the second magnetic induction lines of the second drive magnet are opposite in directions, and the second drive magnet and the second magnetic shielding structure are fastened to the bearer.

15. The electronic device according to claim 11, wherein the motor structure further comprises a position detection apparatus configured to detect a position of the bearer, and the position of the bearer is movable.

16. The electronic device according to claim 15, wherein the position detection apparatus comprises a detection component and a sensing magnet, the sensing magnet is disposed on the bearer, the detection component is disposed on the base, and the detection component is configured to detect a magnetic field of the sensing magnet.

17. The electronic device according to claim 11, wherein
the lens is provided with the clamping part and the bearer is provided with the clamping groove; and
the clamping part comprises a protrusion extending from a side of the lens that faces the bearer, and the clamping groove is a groove formed in the bearer on a side of the bearer that faces the lens.

18. The electronic device according to claim 11, wherein the lens and the bearer are secured to each other by an adhesive layer.

* * * * *